(12) United States Patent
Chukka et al.

(10) Patent No.: US 11,600,087 B2
(45) Date of Patent: Mar. 7, 2023

(54) CONVOLUTIONAL NEURAL NETWORKS FOR LOCATING OBJECTS OF INTEREST IN IMAGES OF BIOLOGICAL SAMPLES

(71) Applicant: Ventana Medical Systems, Inc., Tucson, AZ (US)

(72) Inventors: Srinivas Chukka, San Jose, CA (US); Jianxu Chen, Granger, IN (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 11 days.

(21) Appl. No.: 17/459,125

(22) Filed: Aug. 27, 2021

(65) Prior Publication Data

US 2021/0390281 A1 Dec. 16, 2021

Related U.S. Application Data

(62) Division of application No. 16/612,323, filed as application No. PCT/EP2017/079246 on Nov. 15, 2017, now Pat. No. 11,132,529.

(Continued)

(51) Int. Cl.
*G06V 20/69* (2022.01)
*G06K 9/62* (2022.01)
(Continued)

(52) U.S. Cl.
CPC ......... *G06V 20/698* (2022.01); *G06K 9/6256* (2013.01); *G06K 9/6274* (2013.01); *G06N 3/0454* (2013.01); *G06V 10/454* (2022.01)

(58) Field of Classification Search
CPC .. G06V 20/698; G06V 10/454; G06V 10/764; G06V 10/82; G06V 20/69;
(Continued)

(56) References Cited

U.S. PATENT DOCUMENTS

| 8,055,018 | B2 | 11/2011 | Han et al. |
| 8,300,938 | B2 | 10/2012 | Can et al. |

(Continued)

FOREIGN PATENT DOCUMENTS

| WO | WO2010003043 A2 | 1/2010 |
| WO | WO2015177268 A1 | 11/2015 |

OTHER PUBLICATIONS

International Search Report and Written Opinion, dated Apr. 11, 2018 in corresponding PCT/EP207/079246, filed Nov. 15, 2017, pp. 1-8.

(Continued)

*Primary Examiner* — Michael S Osinski
(74) *Attorney, Agent, or Firm* — Kilpatrick Townsend & Stockton LLP

(57) ABSTRACT

Convolutional neural networks for detecting objects of interest within images of biological specimens are disclosed. Also disclosed are systems and methods of training and using such networks, one method including: obtaining a sample image and at least one of a set of positive points and a set of negative points, wherein each positive point identifies a location of one object of interest within the sample image, and each negative point identifies a location of one object of no-interest within the sample image; obtaining one or more predefined characteristics of objects of interest and/or objects of no-interest, and based on the predefined characteristics, generating a boundary map comprising a positive area around each positive point the set of positive points, and/or a negative area around each negative point in the set of negative points; and training the convolutional neural network using the sample image and the boundary map.

20 Claims, 10 Drawing Sheets

Related U.S. Application Data

(60) Provisional application No. 62/423,114, filed on Nov. 16, 2016.

(51) Int. Cl.
*G06N 3/04* (2006.01)
*G06V 10/44* (2022.01)

(58) Field of Classification Search
CPC .... G06V 30/194; G06V 10/44; G06V 20/695; G06V 10/255; G06V 10/50; G06V 10/774; G06V 2201/03; G06V 30/19173; G06K 9/6256; G06K 9/6274; G06K 9/6269; G06K 9/6267; G06K 9/627; G06K 9/6271; G06K 9/622; G06N 3/0454; G06N 3/08; G06N 3/04; G06N 3/084; G06T 7/0012; G06T 7/11; G06T 2207/20084; G06T 2207/20081; G06T 2207/30024; G06T 2207/10056; G06T 7/12; G06T 2207/20076; G06T 7/136; G06T 2207/10024; G06T 2207/30204; G06T 2207/30104; G06T 2207/30101; G06T 2207/10016
See application file for complete search history.

(56) References Cited

U.S. PATENT DOCUMENTS

| | | | |
|---|---|---|---|
| 8,582,860 B2 | 11/2013 | Malon et al. | |
| 9,373,057 B1 | 6/2016 | Erhan et al. | |
| 9,424,494 B1 | 8/2016 | Lineback et al. | |
| 9,589,374 B1 | 3/2017 | Gao et al. | |
| 9,607,217 B2 | 3/2017 | Cetintas et al. | |
| 9,665,802 B2 | 5/2017 | Wang et al. | |
| 9,740,966 B1 | 8/2017 | Chavez et al. | |
| 9,858,675 B2 | 1/2018 | Shen et al. | |
| 9,881,234 B2 | 1/2018 | Huang et al. | |
| 9,886,758 B2 | 2/2018 | Abedini et al. | |
| 9,965,863 B2 | 5/2018 | Xu et al. | |
| 9,971,966 B2 | 5/2018 | Nelson et al. | |
| 10,019,796 B2 | 7/2018 | Al-Kofahi et al. | |
| 10,078,895 B2 | 9/2018 | Madabhushi et al. | |
| 10,095,917 B2 | 10/2018 | Taigman et al. | |
| 10,127,439 B2 | 11/2018 | Wang et al. | |
| 10,140,522 B2 | 11/2018 | Yao et al. | |
| 10,176,363 B2 | 1/2019 | El-zehiry et al. | |
| 10,213,692 B2 | 2/2019 | Velic et al. | |
| 10,235,755 B2 | 3/2019 | Madabhushi et al. | |
| 10,255,663 B2 | 4/2019 | Otsuka et al. | |
| 10,274,420 B2 | 4/2019 | Akhtman et al. | |
| 10,282,589 B2 | 5/2019 | Mesmakhosroshahi et al. | |
| 10,529,072 B2* | 1/2020 | Chefd'hotel | G06N 3/0454 |
| 10,769,493 B2 | 9/2020 | Yu et al. | |
| 10,885,381 B2 | 1/2021 | Deng | |
| 11,009,467 B2 | 5/2021 | Park et al. | |
| 11,132,529 B2 | 9/2021 | Chukka et al. | |
| 2006/0083418 A1 | 4/2006 | Watson et al. | |
| 2008/0095417 A1 | 4/2008 | Pedrizzetti et al. | |
| 2010/0004915 A1 | 1/2010 | Miller et al. | |
| 2010/0172568 A1 | 7/2010 | Malon et al. | |
| 2011/0249883 A1 | 10/2011 | Can et al. | |
| 2013/0121548 A1 | 5/2013 | Kovalan et al. | |
| 2014/0078152 A1 | 3/2014 | Chang et al. | |
| 2014/0314299 A1 | 10/2014 | Santamaria-pang et al. | |
| 2015/0023578 A1 | 1/2015 | Li et al. | |
| 2015/0186755 A1* | 7/2015 | Mehanian | G06V 20/695 |
| | | | 382/128 |
| 2016/0335478 A1 | 11/2016 | Bredno et al. | |
| 2017/0109880 A1 | 4/2017 | Al-Kofahi et al. | |
| 2017/0116461 A1 | 4/2017 | Kakita et al. | |
| 2017/0132450 A1 | 5/2017 | El-zehiry et al. | |
| 2017/0169313 A1 | 6/2017 | Choi et al. | |
| 2017/0186160 A1 | 6/2017 | Satish et al. | |
| 2017/0206440 A1 | 7/2017 | Schrier et al. | |
| 2017/0257579 A1 | 9/2017 | Said et al. | |
| 2017/0262979 A1 | 9/2017 | Xiong et al. | |
| 2017/0262985 A1 | 9/2017 | Finn et al. | |
| 2017/0287134 A1 | 10/2017 | Abedini et al. | |
| 2017/0294017 A1 | 10/2017 | Yuan et al. | |
| 2018/0012365 A1 | 1/2018 | Chefd'hotel et al. | |
| 2018/0020215 A1 | 1/2018 | Ramamurthy et al. | |
| 2018/0032840 A1 | 2/2018 | Yu et al. | |
| 2018/0045654 A1 | 2/2018 | Park et al. | |
| 2018/0075603 A1 | 3/2018 | Hougen et al. | |
| 2018/0130203 A1* | 5/2018 | Abedini | G06T 7/0012 |
| 2018/0158186 A1 | 6/2018 | Wang et al. | |
| 2018/0173571 A1* | 6/2018 | Huang | G06N 3/0481 |
| 2019/0019050 A1 | 1/2019 | Roblek et al. | |
| 2019/0139191 A1* | 5/2019 | Liu | G06K 9/6259 |
| 2019/0205758 A1* | 7/2019 | Zhu | G06K 9/6256 |
| 2019/0220746 A1* | 7/2019 | Liu | G06N 3/084 |
| 2019/0303715 A1* | 10/2019 | Jiang | G06N 3/084 |
| 2020/0065619 A1* | 2/2020 | Liu | G06N 3/0454 |
| 2020/0075148 A1* | 3/2020 | Nguyen | G16H 50/30 |
| 2020/0225811 A1 | 7/2020 | Sieniek | |
| 2020/0250794 A1* | 8/2020 | Zimmer | G06T 3/4053 |
| 2021/0000327 A1 | 1/2021 | Kitamura et al. | |
| 2021/0209448 A1* | 7/2021 | Navarrete Michelini | G06N 3/0454 |
| 2021/0251590 A1* | 8/2021 | Guo | G06T 9/002 |
| 2021/0256266 A1* | 8/2021 | Chen | G06V 10/7715 |
| 2021/0350113 A1* | 11/2021 | Sjögren | G05B 23/024 |
| 2021/0407041 A1* | 12/2021 | Liu | G06T 1/00 |
| 2022/0058803 A1* | 2/2022 | Bhattacharya | G06T 5/50 |

OTHER PUBLICATIONS

Litjens, et al, Scientific Reports, Deep learning as a tool for increased accuracy and efficiency of histopathological diagnosis, 2016, pp. 1-11, vol. 6 No. 1.

Mao, et al, 2015 IEEE 12th International Symposium on Biomedical Imaging, Iteratively Training Classifiers for Circulating Tumor Cell Detection, 2015, pp. 190-194, n/a.

R.onneberger, et al, Computer Science Department and BIOSS Centre for Biological Signalling Studies, University of Freiburg, Germany, U-Net: Convolutional Networks for Biomedical Image Segmentation, 2015, pp. 234-241, 1.

Ling Chen, et al, Machine Learning in Medical Imaging, Deep Learning Based Automatic Immune Cell, 2014, pp. H-24, 1.

Vanishing Gradient Problem, Wikipedia, The Free Encyclopedia, Aug. 8, 2016, 5 pages.

U.S. Appl. No. 16/612,323, Notice of Allowance dated Jun. 3, 2021, 19 pages.

Chen et al., DCAN: Deep Contour-Aware Networks for Accurate Gland Segmentation, Available online at https://arxiv.org/pdf/1604.02677.pdf, Jun. 2016, 10 pages.

Chen et al., Deep Contextual Networks for Neuronal Structure Segmentation, AAAI'16: Proceedings of the Thirtieth AAAI Conference on Artificial Intelligence, Feb. 2016, pp. 1167-1173.

He et al., Deep Residual Learning for Image Recognition, Available Online at: https://arxiv.org/pdf/1512.03385.pdf, Dec. 10, 2015, 12 pages.

Janowczyk et al., Deep Learning for Digital Pathology Image Analysis: A Comprehensive Tutorial with Selected Use Cases, Journal of Pathology Informatics, vol. 7, No. 29, Jul. 26, 2016, 18 pages.

Long et al., Fully Convolutional Networks for Semantic Segmentation, In Proceedings of the Institute of Electrical and Electronics Engineers Conference on Computer Vision and Pattern Recognition, Mar. 8, 2015, 10 pages.

International Application No. PCT/EP2017/079246, International Preliminary Report on Patentability dated May 31, 2019, 11 pages.

International Application No. PCT/EP2017/079246, Invitation to Pay Additional Fees And, Where Applicable, Protest Fee dated Feb. 13, 2018, 12 pages.

(56) References Cited

OTHER PUBLICATIONS

Schmidhuber, Deep Learning in Neural Networks: An Overview, Neural Networks, vol. 61, Jan. 2015, pp. 85-117.

* cited by examiner

CONVOLUTIONAL NEURAL NETWORKS FOR LOCATING OBJECTS OF INTEREST IN IMAGES OF BIOLOGICAL SAMPLES

FIELD OF THE INVENTION

The present disclosure generally relates to the field of medical imaging. Some examples discussed in the present disclosure relate to convolutional neural networks capable of locating objects of interest within images of biological specimens, and to systems and methods of training the disclosed networks using limited ground truth data.

BACKGROUND AND RELATED ART

In the analysis of biological specimens such as tissue sections, cytology images, tissue microarray (TMA) images, cell lines, blood smears, and the like, the biological specimens are sometimes stained with one or more stains or dyes in order to highlight various types of structures within the specimen, such as specific types of tissue, cells, cell organelles, and so forth. This can enable pathologists and other health care professionals to better assess the specimen's morphology and deliver a more accurate diagnosis, prognosis, and treatment plan for the patient.

One method of staining the specimen is hematoxylin and eosin (H&E) staining, in which a dark blue or violet hematoxylin binds to basophilic substances such as DNA and RNA, and a red or pink eosin binds to acidophilic substances such as positively charged amino acid side chains. Thus, cell nuclei on specimen slides stained with H&E are likely to appear in blue or purple, while structures like the cytoplasm, basophils, muscles, erythrocytes, collagen, and mitochondria are likely to appear in different shades of pink or red.

Immunohistochemistry (IHC) staining is another staining technique that has become popular due to its significant efficiencies and the rich diagnostic information that it generates. IHC slide staining can be utilized to identify proteins in cells of a tissue section and hence is widely used in the study of different types of cells, such as cancerous cells and immune cells in biological tissue. For example, IHC staining may be used in research and clinical settings to understand the distribution and localization of the differentially expressed biomarkers of immune cells in a cancerous tissue for an immune response study. For example, tumors often contain infiltrates of immune cells, which may prevent the development of tumors or favor the outgrowth of tumors. In this scenario, multiple stains may be used to target different types of immune cells, and the population distribution of each type of immune cell is used in studying the clinical outcome of the patients.

In situ hybridization (ISH) staining is a technique that uses a labeled complementary DNA. RNA or modified nucleic acids strand (i.e., probe) to localize a specific DNA or RNA sequence in a portion or section of tissue. In situ hybridization can be a powerful technique for identifying specific mRNA species within individual cells in tissue sections, providing insights into physiological processes and disease pathogenesis.

Researchers and clinicians have traditionally examined tissue slides stained with H&E, IHC, ISH, fluorescent ISH (FISH), or other methods under a bright-field or a fluorescence microscope. However, as the assays are becoming more complicated and often require locating and counting of hundreds or thousands of cells of specific types in specific types of regions, performing these tasks manually (and accurately) becomes an increasingly difficult task. Accordingly, more and more researchers and clinicians are beginning to employ "digital pathology" solutions that can help them get faster, more accurate, and more reproducible results. Digital pathology systems include slide scanners that can scan tissue slides to produce very high resolution (e.g., 0.5 or 0.275 microns per pixel) digital images of the tissue. Digital pathology systems also include hardware and/or software solutions for processing, viewing, and managing the biological specimen (e.g., tissue) images. Processing of the images may include enhancing their image quality, compressing and decompressing the images for storage, and in some digital pathology systems, automatically detecting, classifying, and quantifying different types of cells or other objects within the images, and visualizing the detected objects for the user in a convenient manner.

Several methods have been disclosed in the prior art to automatically detect, classify and quantify cells of a certain type within tissue images. Some methods are based on specifically defining the parameters (e.g., shapes, sizes, and colors) of the objects to be detected and using image processing techniques to find objects corresponding to the defined parameters. Such methods, however, tend to be sensitive to changes in staining and imaging conditions and therefore are not suitable for applications with high staining and/or imaging variability.

Machine learning techniques have also been explored for cell detection, such as statistical model matching learned from structured support vector machine (SVM) to identify the cell-like regions. However, these techniques are limited to automatic nucleus detection rather than membrane detection. Since some immune cell markers such as CD3 and CDS for universal T-cells and cytotoxic T-cells respectively are membrane markers, the stain shows a ring appearance rather than the blob appearance of a nucleus.

Deep learning techniques have also been tried. Some deep learning techniques employ "artificial neural networks" (hereinafter, simply "neural networks") that can be trained using sample images containing certain types of objects to later identify objects of the same types in other images. Neural networks are described, for example, in Schmidhuber, J.: "Deep Learning in Neural Networks: An Overview," Neural Networks, Volume 61, January 2015, Pages 85-117. In the field of medical imaging, patch-based neural networks have been described as capable of detecting lymphocytes in tissue images. See, e.g., Janowczyk, A., Madabhushi, A.: "Deep Learning For Digital Pathology Image Analysis: A Comprehensive Tutorial With Selected Use Cases," Journal of Pathology Informatics 7(1), 29 (2016). However, formulating the problem as a patch-based convolutional neural network can result in extremely long inference time and/or reduced classification accuracy.

Higher accuracy may be achieved by using a fully convolutional network (FCN). Some FCNs have been proposed for performing image segmentation, that is, for finding boundaries of different types of objects. See, e.g., Long. J., Shelhamer, E., Darrell, T.: "Fully Convolutional Networks For Semantic Segmentation" in Proc. of IEEE Conf. on Computer Vision and Pattern Recognition (CVPR). pp. 3431-3440 (2015); Ronneberger, O., Fischer, P., Brox, T.: "U-net: Convolutional Networks For Biomedical Image Segmentation" in Proc. of Medical Image Computing and Computer Assisted. Intervention (MICCAI), Part III. pp. 234-241 (2015); Chen, H., Qi, X., Yu, L., Heng, P.: "DCAN: Deep Contour-Aware Networks For Accurate Gland Segmentation," arXiv preprint arXiv:1604.02677 (2016); and Chen, H., Qi, X., Cheng, J., Heng, P.: "Deep Contextual Networks For Neuronal Structure Segmentation" in Proc. of AA.AI Conference on Artificial Intelligence (2016).

Such FCNs, however, may need to be trained using a large number (e.g., thousands) of precisely annotated sample images before they could produce accurate results, where "precisely annotated" may mean that every single pixel in the training image needs to be identified as either belonging to an object of interest or not Obtaining a sufficient amount of samples images with manually entered pixel-level annotations may not be feasible in fields like digital pathology, where the annotations may only be performed by highly skilled professionals such as pathologists who have very busy schedules and whose time is very valuable.

Accordingly, it is desirable to have a system and method for accurately detecting objects of interest in biological specimen images, where the system can be trained with limited amounts of ground truth data.

SUMMARY

Disclosed herein are convolutional neural networks for detecting objects of interest within images of biological specimens. Also disclosed are systems and methods of training and using such networks, one method including: obtaining a sample image (defined below) and at least one of a set of positive points and a set of negative points, wherein each positive point identifies a location of one object of interest (also defined below) within the sample image, and each negative point identifies a location of one object of no-interest within the sample image; obtaining one or more predefined characteristics of objects of interest and/or objects of no-interest, and based on the predefined characteristics, generating a boundary map comprising a positive area around each positive point the set of positive points, and/or a negative area around each negative point in the set of negative points; and training the convolutional neural network using the sample image and the boundary map.

In some embodiments, an image analysis system that includes a convolutional neural network and a network training engine is disclosed. The engine may obtain a sample image of a biological specimen; obtain a set of positive points and/or a set of negative points, wherein each positive point in the set of positive points identifies a location of an object of interest within the sample image, and each negative point in the set of negative points identifies a location of an object of no-interest within the sample image; obtain one or more predefined characteristics of objects of interest and/or objects of no-interest; based on the one or more predefined characteristics, generate a boundary map comprising a positive area around each positive point in the set of positive points and/or a negative area around each negative point in the set of negative points; and using the sample image and the boundary map, train the convolutional neural network to detect objects of interest.

In some aspects, the image analysis system may also include an object detection engine that can obtain a new image of a biological sample; provide the new image to the convolutional neural network; and receive from the convolutional neural network a detection map indicating locations of a set of objects of interest within the new image. The object detection engine can also obtain user input indicating at least one location of a misidentified object within the new image. Based on and responsive to the user input, the network training engine may fine-tune the convolutional neural network.

In some aspects, the convolutional neural network of the image analysis system may include a plurality of encoders, where each encoder may include a first convolutional unit, a rectified linear unit, and a downsampling unit; and a plurality of decoders, where each decoder may include an upsampling unit and a second convolutional unit. Each of the plurality of decoders can be directly coupled to a corresponding encoder from the plurality of encoders.

In some aspects, the predefined characteristics of objects of interest and/or objects of no-interest mentioned above may include a first radius associated with the objects of interest, and the positive area around each positive point may include a circle having a radius not greater than the first radius. In one aspect, each positive area may include an inner area associated with a first weight and an outer area associated with a second weight, wherein the second weight is lower than the first weight. In one aspect, the predefined characteristics mentioned above may also include a second radius associated with objects of no-interest, and the negative area around each negative point may include a circle having a radius no greater than the second radius.

In some aspects, the network training engine may generate a derivative sample image and a corresponding derivative boundary map by flipping the sample image and the boundary map horizontally, flipping the sample image and the boundary map vertically, and/or rotating the sample image and the boundary map by a predefined or random angle. The engine may then further train the convolutional neural network using the derivative sample image and the corresponding derivative boundary map.

In some aspects, the network training engine may also obtain a set of positive scribbles and/or a set of negative scribbles, and the boundary map may also include a second positive area corresponding to each positive scribble in the set of positive scribbles, and a second negative area corresponding to each negative scribble in the set of negative scribbles.

In some embodiments, a method of training a convolutional neural network to detect objects of interest within images of biological specimens is disclosed. The method may include obtaining a sample image and at least one of a set of positive points and a set of negative points, where each positive point identifies a location of one object of interest within the sample image, and each negative point identifies a location of one object of no-interest within the sample image. The method may also include obtaining one or more predefined characteristics of objects of interest and/or objects of no-interest, and based on the predefined characteristics, generating a boundary map comprising a positive area around each positive point the set of positive points, and/or a negative area around each negative point in the set of negative points. The method may also include training the convolutional neural network using the sample image and the boundary map.

In some aspects, the method may also include, after training the convolutional neural network, feeding into the convolutional neural network a new image of a biological specimen, causing the convolutional neural network to produce a detection map indicating locations of a plurality of objects of interest within the new image. The method may also include, based on the detection map, highlighting the locations of the plurality of objects of interest within the new image. The method may further include, after highlighting the locations of the plurality of objects of interest within the new image, obtaining user input indicating a location of a misidentified object of interest and/or a misidentified object of no-interest, and fine-tuning the convolutional neural network based on the user input.

In some embodiments, a convolutional neural network for identifying objects of interest in images of biological specimens is disclosed. The network may include, for example, a plurality of encoders comprising a first encoder that comprises a first convolutional unit, a rectified linear unit, and a downsampling unit. The first encoder may receive encoder input data, process the input data with at least the first convolutional unit and the rectified linear unit to produce processed data, downsample the processed data with the downsampling unit to produce downsampled processed data, and output the processed data and the downsampled processed data. The network may also include a plurality of decoders comprising a first decoder that comprises an upsampling unit and a second convolutional unit. The first decoder may receive decoder input data from a second decoder from the plurality of decoders or from a second encoder from the plurality of encoders, upsample the decoder input data to produce upsampled data, receive processed data from the first encoder, combine the upsampled data with the processed data to produce combined upsampled data, process the combined upsampled data with at least the second convolutional unit to produce processed combined upsampled data, and output the processed combined upsampled data. In one aspect, the convolutional neural network can be a fully convolutional neural network.

In some embodiments, a non-transitory computer-readable storage medium encoded with instructions executable by a processing resource of a computing system is disclosed. The instructions, when executed by the processing resource, can cause the computing system to obtain a new image of a biological sample; provide the new image to a trained convolutional neural network, wherein the trained convolutional network comprises a plurality of encoders (where each encoder comprises a first convolutional unit, a rectified linear unit) and a downsampling unit, and a plurality of decoders (where each decoder comprises an upsampling unit and a second convolution unit) where each of the plurality of decoders is coupled to a corresponding encoder from the plurality of encoders. The instructions may also cause the computing system to receive from the trained convolutional neural network a detection map indicating locations of a plurality of objects of interest within the new image, and based on the detection map, to highlight the plurality of objects within the new image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following embodiments of the invention are explained in greater detail, by way of example only, making reference to the drawings in which.

DETAILED DESCRIPTION

The present disclosure describes, among other things, a convolutional neural network for detecting objects of interest within images of biological specimens. Also described are exemplary systems and methods of effective training and use of the convolutional neural network for accurate detection of objects of interest. For exemplary purposes, some embodiments discussed below describe a neural network being trained to detect lymphocytes in H&E slide images. However, it will be evident to a person having ordinary skill in the art that the disclosed network can be trained and used for detecting any type of objects of interest within any type of sample images. As used herein, "sample images" include digital images of any biological specimens of any type, such as tissue images (e.g., H&E images, IHC images, ISH images, FISH images, multiplex images, etc.), cytology images, tissue microarray (TMA) images, cell lines, blood smears, and the like. As will be discussed below, sample images may have been obtained, e.g., by scanning a slide containing the biological specimen, where the specimen may have been stained with one or more assays. The sample images used for training the network may be either "raw" images that did not undergo any processing, or images that have been processed using any number of image processing techniques in order to improve and/or normalize their appearance. Furthermore, a sample image used for training the network may be a color image or a monochrome image, where the monochrome image may represent, for example, one color channel (e.g., R, G, or B) of an original color image.

As used herein, "objects of interest" refer to biological objects (e.g., cells, cell membranes, cell nuclei, etc.) of a certain type (or a number of types) that network 113 has been trained to locate. For example, objects of interests may be defined as all cells of a certain type (e.g., lymphocytes), all cells stained with a certain type of stain (e.g., hematoxylin), all nuclei of cells of a certain type, and so forth.

Figure 1:
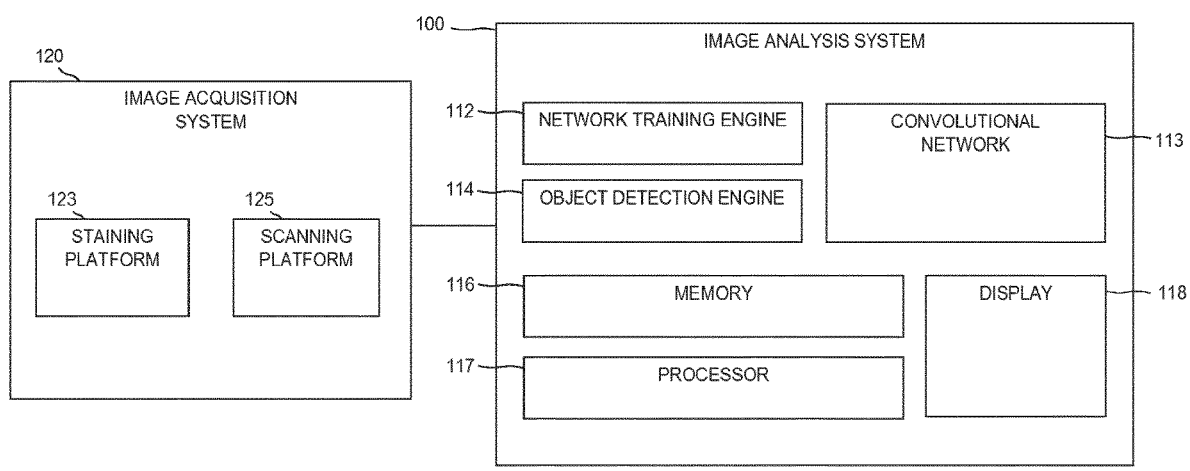
FIG. 1 is a block diagram of an exemplary image analysis system and an exemplary image acquisition system, in accordance with some embodiments.

FIG. 1 is a block diagram of an image analysis system 100, according to an exemplary embodiment of the subject disclosure. Image analysis system 100 may include one or more computing devices such as desktop computers, laptop computers, tablets, smartphones, servers, application-specific computing devices, or any other type(s) of electronic device(s) capable of performing the techniques and operations described herein. In some embodiments, image analysis system 100 may be implemented as a single device. In other embodiments, image analysis system 100 may be implemented as a combination of two or more devices together achieving the various functionalities discussed herein. For example, image analysis system 100 may include one or more server computers and a one or more client computers communicatively coupled to each other via one or more local-area networks and/or wide-area networks.

As illustrated in FIG. 1, image analysis system 100 may include a memory 116, a processor 117, and a display 118. Memory 116 may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. For brevity purposes memory 116 is depicted in FIG. 1 as a single device, but it is appreciated that memory 116 can also be distributed across two or more devices.

Processor 117 may include one or more processors of any type, such as central processing units (CPUs), graphics processing units (GPUs), special-purpose signal or image processors, field-programmable gate arrays (FPGAs), tensor processing units (TPUs), and so forth. For brevity purposes processor 117 is depicted in FIG. 1 as a single device, but it is appreciated that processor 117 can also be distributed across any number of devices.

Display 118 may be implemented using any suitable technology, such as LCD, LED, OLED, TFT, Plasma, etc. In some implementations, display 118 may be a touch-sensitive display (a touchscreen).

As illustrated in FIG. 1, image analysis system 100 may also include a network training engine 112, a convolutional neural network 113, and an object detection engine 114. While each of these modules is depicted in FIG. 1 as a standalone module, it will be evident to persons having ordinary skill in the art in view of the present disclosure that this is done for illustration purposes only and that each module may be implemented as a number of sub-modules, and that in some embodiments any two or more modules can be combined into a single module. Furthermore, some of the engines or functionalities thereof may be disabled or omitted. For example, system 100 that is installed at the customer site may not include network training 112 if network 113 has already been fully trained, or may only include the fine-tuning functionality of network training engine 112 discussed in more detail below.

As will be discussed in more detail below, the functionality of some or all modules of system 100 can be implemented in hardware, software, firmware, or as any combination thereof. It will also be appreciated by persons skilled in the art that in some embodiments system 100 may include a number of components not shown in FIG. 1 for brevity, such as input devices, networking and communication modules, and the like.

As depicted in FIG. 1, in some embodiments image analysis system 100 may be communicatively coupled to an image acquisition system 120. Image acquisition system 120 may obtain images of biological specimens and provide those images to image analysis system 100 for analysis and presentation to the user.

Image acquisition system 120 may include an automated staining platform 123 for staining biological specimen slides using H&E, IHC, ISH, FISH, or any other staining process. Commercially available staining platforms include, for example, HE 600, BENCHMARK XT, and BENCHMARK ULTRA products by Ventana Medical Systems. Inc. Image acquisition system 120 may also include a scanning platform 125 such as a slide scanner that can scan the stained slides at 20×, 40×, or other magnifications to produce high resolution whole-slide digital images. Commercially available slide scanners include, for example, VENTANA iScan HT and iScan Coreo products by Ventana Medical Systems, Inc.

Images generated by scanning platform 125 may be transferred to image analysis system 100 or to a server or database accessible by image analysis 100. In some embodiments, the images may be transferred automatically via one or more local-area networks and/or wide-area networks. In some embodiments, image analysis system 100 may be integrated with or included in scanning platform 125 and/or other modules of image acquisition system 120, in which case the image may be transferred to image analysis system, e.g., through a memory accessible by both platform 125 an system 120. In some embodiments, image acquisition system 120 may not be communicatively coupled to image analysis system 100, in which case the images may be stored on a non-volatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by staining platform 123, and where the slide may have been scanned by a slide scanner or another type of scanning platform 125. It is appreciated, however, that in other embodiments, image analysis system 100 may also obtain images of biological samples, where the samples and/or the images have been acquired through means other than those discussed above.

Convolutional Neural Network for Locating Objects of Interest

After obtaining an image of a biological specimen, image analysis system 100 may process the image using convolutional neural network 113 to produce a detection map indicating the locations of all (or most of) the objects of interest within the image.

Figure 2A:
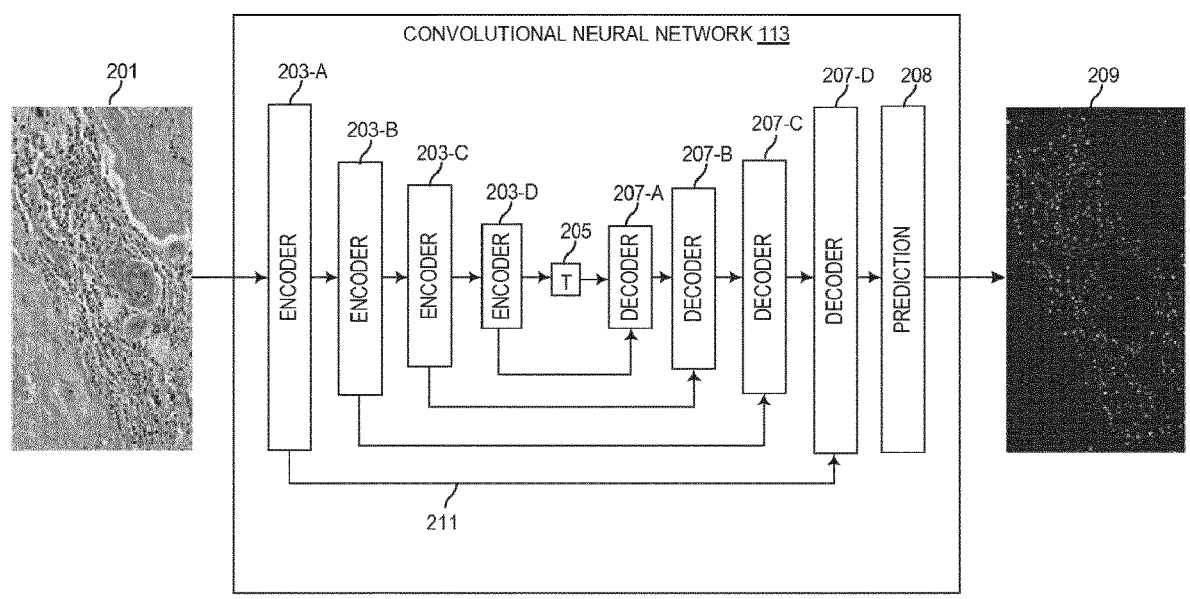
FIG. 2A is a block diagram of an exemplary convolutional neural network, in accordance with some embodiments.

FIG. 2A shows a block diagram of an exemplary network 113 that can receive a biological specimen image 201 (in this example, an H&E image), and output a detection map 209 that indicates the probabilistic location of all objects of interest (in this example, lymphocytes) within biological specimen image 201. In some embodiments, biological specimen image 201 may be a whole-slide image, that is, an image of the entire tissue slide, or at least of the entire area containing tissue. In other embodiments, biological specimen image 201 may represent a portion of a whole-slide image, in which case different overlapping or non-overlapping portions of the whole-slide image can be processed by network 113 separately, after which the resulting partial detection maps 209 can be combined ("stitched") together to produce a whole-slide detection map 209.

Figure 2B:
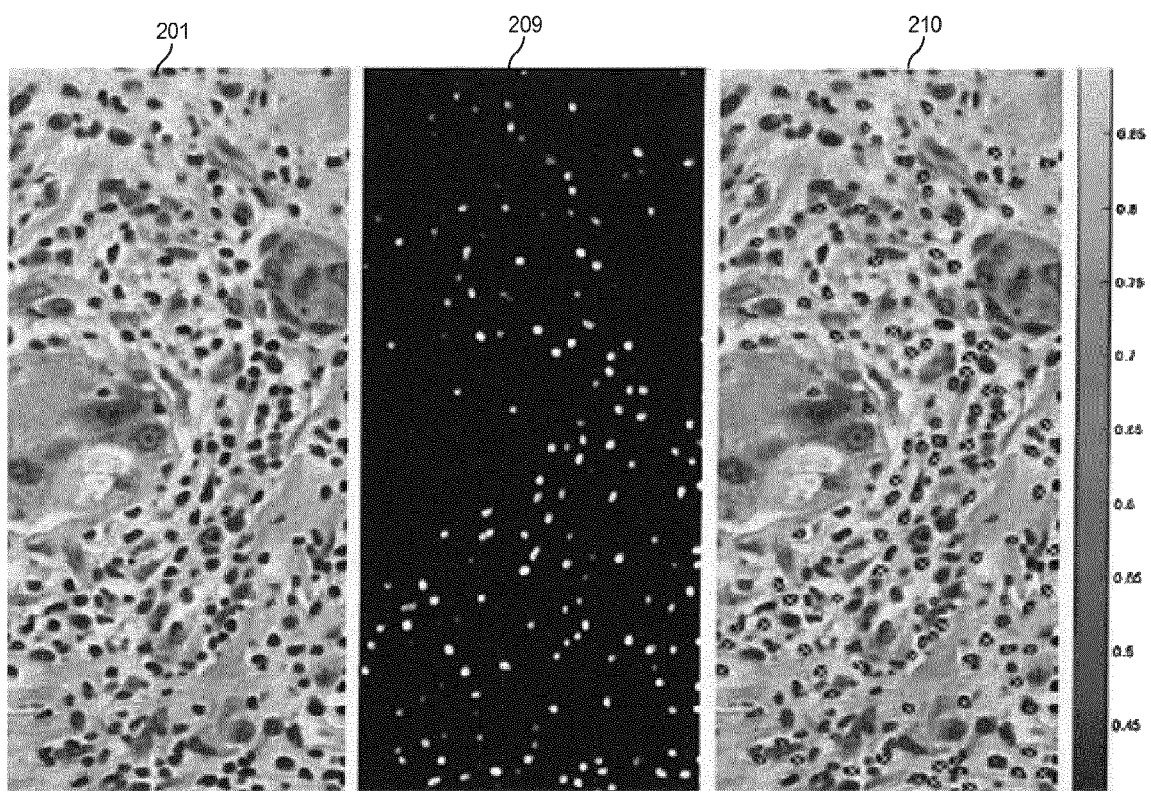
FIG. 2B illustrates an exemplary biological specimen image, an exemplary detection map, and an exemplary overlaid image, in accordance with some embodiments.

In some embodiments, detection map 209 may specify, for each pixel of biological specimen image 201, the probability that the pixel corresponds to an object of interest, where a pixel may be said to correspond to an object of interest if the pixel is located within the boundaries of an object of interest. In some embodiments, the probabilities of nearby pixels can aggregated to determine the boundary of an object and the average probability of that object being an object of interest. In addition, in some embodiments a single marker (e.g., an "X") may be generated and overlaid upon each identified object of interest. In some embodiments, the marker's shape, color, or other parameters can be selected to indicate the underlying object's probability of being an object of interest. This is illustrated in an example of FIG. 2B, which shows an exemplary biological specimen image 201 and an exemplary detection map 209, as well as an overlaid image 210 marking various objects in image 201 in accordance with their aggregate probabilities determined based on detection map 209. In the example of FIG. 2B, the color of each mark indicates the probability level associated with the particular object.

In some embodiments, detection map 209 may additionally or alternatively specify for each pixel the probability of that pixel not corresponding to an object of interest. In some embodiments, instead of specifying different probability values for each pixel, detection map 209 can be automatically reduced to a binary map that has one value (e.g., 0) for pixels below a certain threshold probability (e.g., 0.5, 0.7, 0.95, or the like) and another value (e.g., 255) for pixels above or equal to that threshold. Accordingly, in these embodiments, overlaid image 210 may only mark objects above (or equal to) the certain threshold, and not mark objects below that threshold.

In some embodiments, after network 113 produces detection map 209 and some additional processing is optionally performed (e.g., to reduce and/or aggregate detection map 209 as discussed above) system 100 may automatically calculate the number of objects of interest (e.g., objects associated with a probability above a certain threshold) within the whole slide or within an area selected by the user, and present that number to the user.

Referring now back to the exemplary network 113 illustrated in FIG. 2A, network 113 may include, among other things, a plurality of encoders 203 (e.g., 203-A, 203-B, 203-C, and 203-D) followed by a plurality of decoders 207 (e.g., 207-A, 207-B, 207-C, and 207-D). In some embodiments, network 113 may also include a transitional block 205 (which may be positioned after encoder 203-D and before decoder 207-A) and a prediction block 208, which may follow decoder 207-D and in some embodiments be the last block in the pipeline.

As will be discussed in more detail below, the functionality of each module of network 113 can in various embodiments be implemented in hardware, software, firmware, or using any combination thereof. A person skilled in the art will also appreciate that the particular number and arrangement of the different modules depicted in the example of FIG. 3 refers to only one embodiment of the present disclosure, and that in other embodiments some modules may be added, omitted, repositioned, grouped, divided into sub-modules, or otherwise modified without departing from the spirit and scope of the present disclosure.

In some embodiments, each module of network 113 can be characterized by its input and output data dimensions. In some embodiments, data that is obtained, processed, and outputted by each block in network 113 may have at least three dimensions: width, height, and depth. In some embodiments, width and height (collectively, "pixel resolution") may have a fixed aspect ratio. In some embodiments encoders 203 and decoders 207 may change the pixel resolution of the input data by downsampling or upsampling it. For example, each encoder 203 may reduce the pixel resolution by a factor two, and each decoder may increase the pixel resolution by a factor of two. In this example, if the resolution of biological specimen image 201 is, for example, 240×720, decoders 203-A, 203-B, 203-C, and 203-D may process data of pixel resolution 240×720, 120×360, 60×120, and 30×60, respectively, and transitional block 205, decoders 207-A, 207-B, 207-C, and 207-D, and prediction block 208 may process data of pixel resolution 15×30, 30×60, 60×120, 120×360, 240×720, and 240×720, respectively. As illustrated in this example, in some embodiments, each encoder 203 in network 113 may have a corresponding decoder 207 of the same (or substantially the same) resolution. In other embodiments, however, some encoders 203 may not have a decoder 207 with corresponding resolution, and vice versa. Furthermore, in some embodiments, the number of encoders 203 in network 113 may be different from to the number of decoders 207.

The depth of data processed by various blocks of network 113 may also be different, and the depth of the output of a particular block may be different than the depth of its input. Data depth may be defined as the number of values associated with each pixel. In some embodiments, each value may represent a feature computed for the particular pixel. Thus, for example, encoder 203-A may output image data having a depth of 64, meaning that each pixel in the output data is associated with 64 values, each value representing a different feature generated for that pixel. In other words, encoder 203-A may output image data associated with 64 feature maps.

In some embodiments, the depth of data output by each encoder 203 or decoder 207 may be in inverse relationship with the data's pixel resolution. To illustrate this using the example provided above, encoders 203-A, 203-B, 203-C, and 203-D may output data having depth of 64, 128, 256, and 512, respectively, and decoders 207-A, 207-B, 207-C, and 207-D may output data having depth of 512, 256, 128, and 64, respectively. Thus, in some embodiments, each encoder 203 may have a decoder 207 corresponding to it in terms of depth and/or pixel resolution of the processed data, and vice versa. In such embodiments, corresponding encoders 203 and decoders 207 may be communicatively coupled via links 211, as illustrated in FIG. 2A. As illustrated in FIG. 2A, in some embodiments, each encoder 203 can be coupled to a corresponding decoder 207 directly, i.e., not through other encoders 203, decoders 207, transitional block 205, or other blocks depicted in FIG. 2A.

Figure 3A:
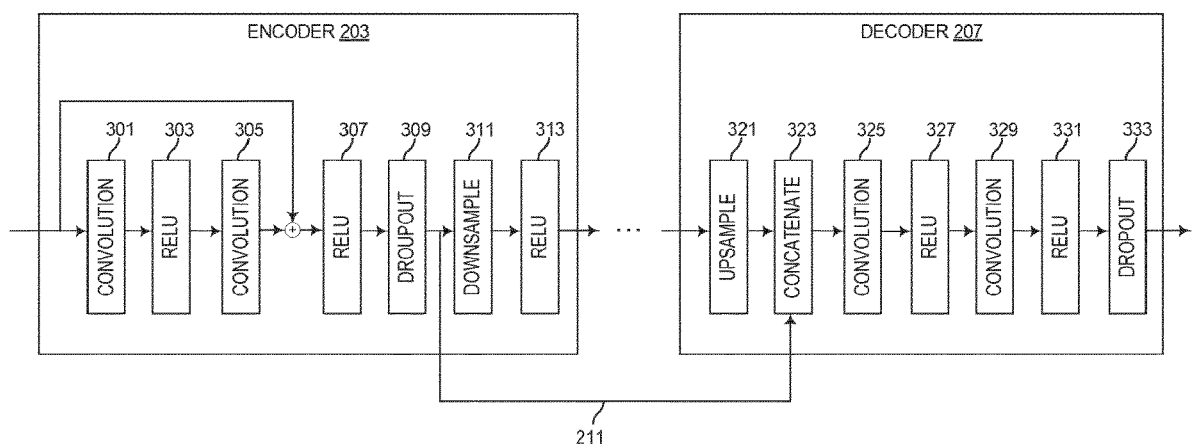
FIG. 3A is a block diagram of an exemplary encoder and an exemplary decoder of the convolutional neural network, in accordance with some embodiments.

FIG. 3A shows block diagrams of an exemplary encoder 203 and an exemplary decoder 207, in accordance with some embodiments. Encoder 203 and decoder 207 may each be implemented as a single block or as a plurality of blocks, as discussed in more detail below. As will be discussed in more detail below, the functionality of each of these blocks can be implemented in hardware, software, firmware, or using any combination thereof. Furthermore, a person skilled in the art will appreciate that the particular number and arrangement of the different blocks depicted in the example of FIG. 3A refers to only one embodiment of the present disclosure, and that in other embodiments some blocks may be added, omitted, repositioned, combined into fewer blocks, split into more blocks, or otherwise modified without departing from the spirit and scope of the present disclosure.

In the embodiment illustrated in FIG. 3A, encoder 203 includes convolutional units 301 and 305, rectified linear units (ReLUs) 303, 307, and 313, a downsampling unit (e.g., 311) and a dropout unit 309, where the units are arranged in a serial (more specifically, in a directed acyclic graph) manner. Each convolutional unit (e.g., 301 and/or 305) may be configured to obtain an input image and to convolve a trainable filter or kernel across the entire input image, computing the dot product between the entries of the filter and the input image and producing a two-dimensional activation map of that filter. As a result, network 113 learns which filters activate in response to a particular type of feature at a particular spatial position in the input. The trainable filters may be, for example, 3×3 filters, 5×5 filters, or filters of any other size. Each convolutional unit (e.g., 301 and/or 305) may convolve the input image with any number of different trainable filters, thereby generating a number of activation maps for the image, where the number of filters and the resulting activation maps indicates the depth of data that would be produced by the convolutional unit.

Sometimes the number of trainable parameters in network 113 may become too large relative to the amount of training ("ground truth") data, causing network 113 to become so sensitive that it would pick up and get trained based on the finest details of the training data, including random image noise. As a result, network 113 may become less generalized, i.e., less effective in detecting objects of interest in new images. To address this issue, sometimes referred to as "overfitting," some or all encoders 203 may include a dropout unit 309, which may be configured to randomly or pseudo-randomly excluding some portion (e.g., 50%) of filters or other trainable parameters of the network from being trained at a given iteration. As a result, different filters or other parameters may be trained at different times, such that the number of trainable parameters at any given time is reduced, thereby avoiding or minimizing the overfitting effect.

As illustrated in FIG. 3A, in some embodiments each convolutional unit (e.g., 301 and 305) and downsampling unit 311 may be coupled to a rectified linear unit (e.g., 303, 307, and 313). Rectified linear units 303, 307, and 313 can each be configured to obtain an input image and to apply to the input image a rectifier function such as $f(x)=\max(0,x)$, or a function approximating a rectifier, such as the softplus function $f(x)=\ln(1+e^x)$.

In some embodiments, as illustrated in FIG. 3A, the output of at least one convolutional unit (e.g., 305) may be added to or otherwise combined with data that has not been processed by that convolutional unit (e.g., 305), such as with an input to encoder 203. The combined data may then be processed by a rectified linear unit (e.g., 307). Combining data that was processed by at least one convolutional unit with data that was not processed by that convolutional unit can have the effect of "residual learning," which can improve the effectiveness of the network's learning. Residual learning is discussed, for example, in He K. Zhang X, Ren S, Sun J.: "Deep residual learning for image recognition," arXiv preprint arXiv:1512.03385 (2015).

Downsampling unit 311 may downsample or downscale the image data by reducing its resolution by a predefined ratio, such as 1:2, 1:3, etc. In some embodiments, downsampling unit 311 may downsample the image data by a factor of two in each dimension, for example, by convolving the image data with a 2×2 filter using a stride of two.

FIG. 3A also illustrates an example decoder 207. Decoder 207 may include a number of convolutional units (e.g., 325 and 329) which may be same or similar in functionality to convolutional units 301, 305, or 311 of encoder 203. It is appreciated that each convolutional unit of decoder 207 and encoder 203 may be trained independently of each other. Similarly, decoder 207 may include rectifying linear units 327 and 331 that may be functionally similar to rectifying linear units 303, 307, and 313 of encoder 203, and a dropout unit 333 that may be functionally similar to dropout unit 309 of encoder 203. Decoder 207 may also include an upsampling unit 321 that may upsample image data by a predefined factor. For example, upsampling unit 321 may upsample incoming image data by a factor of two by performing a 2×2 deconvolution with a stride of 2.

Decoder 207 may also include a concatenation unit 323 configured to receive image data from encoder 203 and concatenate it to image data that has been upsampled by upsampling unit 321. More specifically, as illustrated in FIG. 3A, concatenation unit 323 of decoder 207 may concatenate image data upsampled by upsampling unit 321 to image data that has not yet been downsampled by downsampling unit 311 of the corresponding encoder 203. As used herein, "concatenation" refers to appending feature maps of one image data with another image data along the depth dimension, without changing the pixel resolution (i.e., the width and height) of the image data. For example, concatenating two 120×360 images each having a depth of 32 (i.e., having 32 feature maps for each pixel) can result in a 120×360 image having a depth of 64. Because in the example of FIG. 3A image data obtained from encoder 203 via link 211 has not been downsampled by downsample unit 311, concatenating it to upsampled data of decoder 207 results in fusing information of different levels of abstraction, which can increase the representational capability of the network. Link 211 may also act as a shortcut that can help reduce the vanishing gradient problem during network training, the problem being described, for example, in "Vanishing gradient problem," Wikipedia, The Free Encyclopedia, 8 Aug. 2016.

Figure 3B:
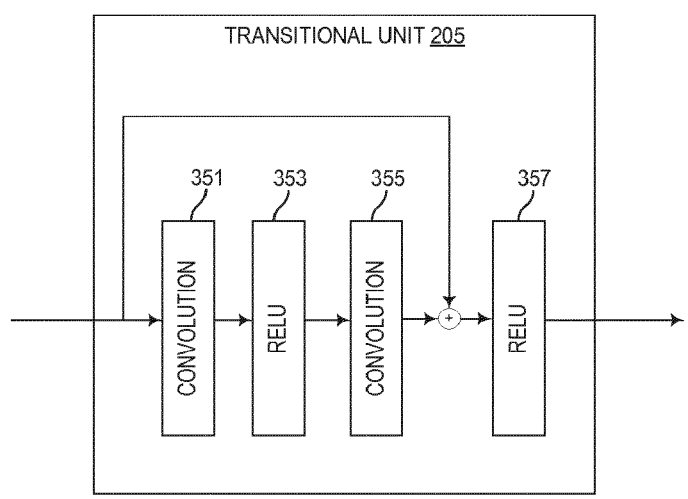
FIG. 3B is a block diagram of an exemplary transitional unit of the convolutional neural network, in accordance with some embodiments.

Referring now to FIG. 3B, exemplary transitional unit 205 is described. In some embodiments, the functionality of transitional unit 205 may be similar to that of encoder 203, with the exception that transitional unit 205 may not include a downsampling unit. Thus, for example, transitional unit 205 may include two convolutional units 351 and 355 and two rectified linear units 353 and 357, where rectified unit 357 may be configured to receive and process a combination (e.g., a sum) of image data from the output of convolutional unit 355 and from the input to transitional unit 205.

As discussed above in connection with FIG. 2A, network 113 may also include prediction unit 208. In some embodiments, prediction unit 208 may obtain input image data (e.g., output of decoder 207-D) and transform the input image data into detection map 209, which, as discussed above, may associate each pixel with a probability value representing, for example, the probability that the pixel corresponds to an object of interest, or representing whether that probability is above, below, or equal to a certain probability threshold. In some embodiments, prediction unit 208 may generate detection map 209 by applying to the input image data a 1×1 convolution and a softmax function, where the convolution and the softmax function may be performed by one or more sub-modules of prediction unit 208, not shown in FIG. 2A for brevity.

In some embodiments, such as the embodiment illustrated in FIG. 2A, network 113 may be a fully convolutional neural network, that is, a convolutional neural network that does not include any fully connected layers, such as layers having neurons connected to all activations in the previous layer. In other embodiments, network 113 may not be a fully convolutional neural network and may include one or more fully connected layers.

Training a Convolution Network Using Limited Ground Truth Data

Figure 4:
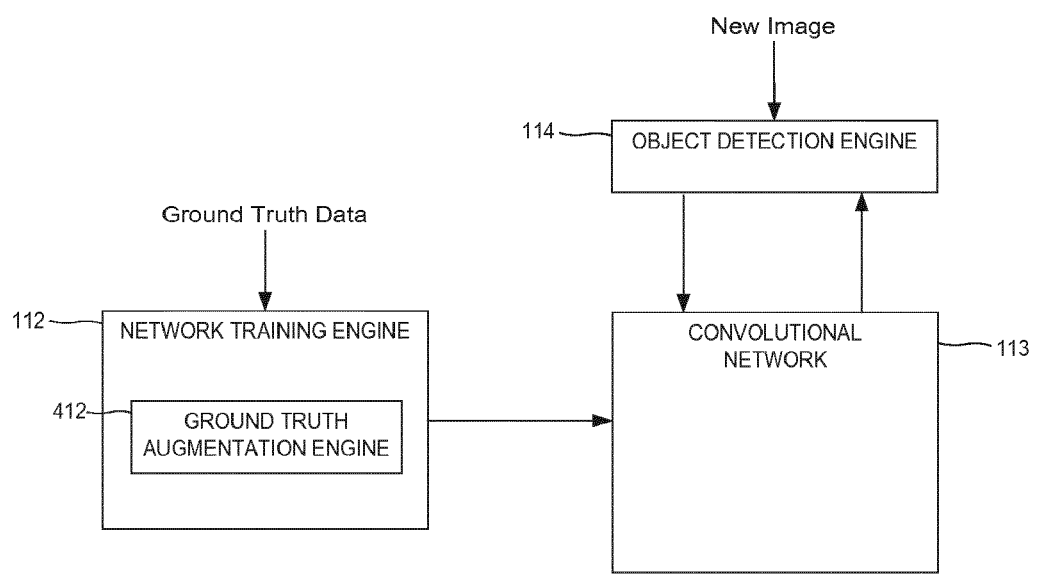
FIG. 4 is a block diagram of an exemplary subsystem of the image analysis system, in accordance with some embodiments.

As mentioned above, in order for network 113 to be effective in accurately identifying objects of interest within an image, network 113 may need to be trained first. FIG. 4 illustrates modules of image analysis system 100 that may in some embodiments be involved in training network 113. As illustrated in FIG. 4, network training engine 112 may obtain ground truth data. Ground truth data may include one or more sample images that include objects of interest. Ground truth data may also include location data identifying locations of the objects of interest within the sample images. To improve the accuracy of network 113, location data may also identify locations of other types of objects which may be referred to as "objects of no-interest."

Location data corresponding to each sample image may be, for example, embedded into (e.g., overlaid on) the sample image, or included in a separate file, map, or image associated with the sample image. In some embodiments, network training engine 112 may obtain the location data and the sample images from the same source, such as an external database or storage. In other embodiments, network training engine may obtain the location data separately from the sample images, e.g., after obtaining the sample images. For example, engine 112 may display one or more sample images on display 118, and collect from the user (e.g., a pathologist) user inputs identifying the locations of objects of interest and/or the objects of no-interest.

In some embodiments, location data obtained by engine 112 from the user or from an external source may be detailed enough to identify the exact boundaries of objects of interest and/or objects of no-interest. Such information, referred to herein as a "boundary map," may be directly used by network training engine 112 for training network 113 with minimal or no additional processing.

Sometimes, however, obtaining such a boundary map may not be possible. For example, if it takes a user fifteen seconds on average to identify the boundaries of each object, collecting boundary maps for a thousand objects may take the user more than four hours, and some networks may need to be trained based on many thousands of objects before they can start producing accurate results. Moreover, accurate boundary maps can typically be drawn only highly skilled medical personnel such as pathologists whose time is incredibly valuable and would be much better spent on their primary responsibilities, such as analyzing the biological samples to provide diagnosis, prognosis, and treatment selection for their patients.

Accordingly, in some embodiments, in order to obtain large amounts of boundary maps in a reasonable time, network training engine 112 may be able to obtain "approximate location data" and use ground truth augmentation engine 412 to automatically generate a boundary map based on the approximate location data. Approximate location data may include, for example, point location data that identifies the location (e.g., the approximate center) of each object by a single point (e.g., by its (x, y) coordinates). As mentioned above, network training engine 112 may obtain the point data from external source together with the sample images, or it may obtain the point location based on the user's inputs. For example, the user may be presented a sample image and asked to identify locations of any objects of interest and/or objects of no-interest within the image. The user can identify each object, for example, by clicking or touching anywhere within (or near) the area of that object. Because such one-click or one-touch selection can be performed significantly (e.g., 10 times) faster than collecting precise boundary annotation for each object, it enables great amounts of location data (and location data of greater diversity) to be collected in a relatively short period of time.

In some embodiments, to further speed up the selection process, network training engine 112 may pre-locate a plurality of objects within the image, without distinguishing objects of interest from objects of no-interest. This can be achieved using any suitable techniques, such as adaptive thresholding or other classical image processing algorithms. Engine 112 may then mark the location of each pre-located object on the display (e.g., 118), further facilitating the user's identification and selection of objects of interest (and/or objects of no-interest). Furthermore, in some embodiments, the user may use tools allowing multiple object selections. For example, the user may define a specific area within the image, and indicate that all the pre-located objects within the defined are objects of interest (or as objects of no-interest).

In some embodiments, approximate location data may also include scribble location data. Scribble location data may include any type of free-hand scribble within the object of interest and may be used, for example, to identify and select objects having irregular (e.g., non-circular) shapes.

It is appreciated that in addition to speeding up the process of ground truth data collection, the method described herein provides flexibility by allowing the user to identify any number of objects of interest within the image, and by not requiring the user to identify all objects of interest within the image. That is, the approximate location data collected from the user may only identify a subset of all the objects of interest, where some of the objects of interest are not identified.

Figure 5:
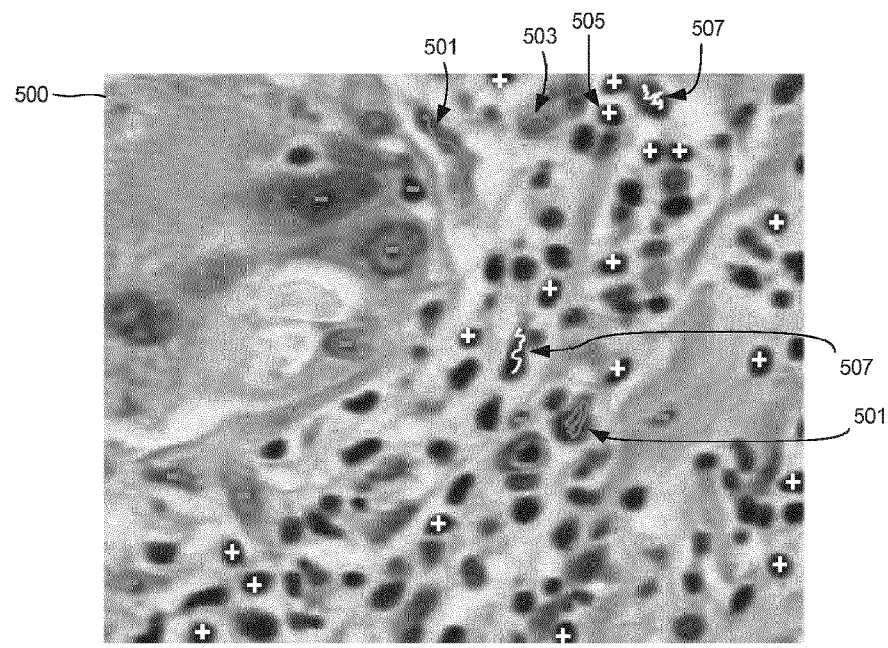
FIG. 5 illustrates an exemplary sample image and approximate location data used for training the convolutional neural network, in accordance with some embodiments.

To illustrate some embodiments discussed above, FIG. 5 shows an exemplary sample image 500 on which approximate location data obtained from the user is overlaid. In this example, approximate location data includes point location data and scribble data. Point location data includes positive points 505 (marked by white "+" markers) that identify objects of interest, and negative points 503 (marked by blue "−" markers) that identify objects of no-interest. Scribble location data in this example includes positive scribbles 507 (marked in white) identifying objects of interest and negative scribbles 501 (marked in blue) identifying objects of no-interest. It is appreciated that in some embodiments, not all types of approximate location data may be available. Thus, approximate location data obtained for a given sample image may include any combination of the following sets: one or more positive points; one or more negative points; one or more positive scribbles; and one or more negative scribbles. As mentioned above, in some embodiments the location data may advantageously only describe a subset of objects of interest and/or a subset of objects of no-interest, such that some objects of interest and/or objects of interest in the sample image are not identified by the location data. It is appreciated that in some embodiments, approximate location data may include other types of location data that identifies locations of objects of interest and/or objects of no-interest without defining the precise boundaries of those objects.

Figure 6:
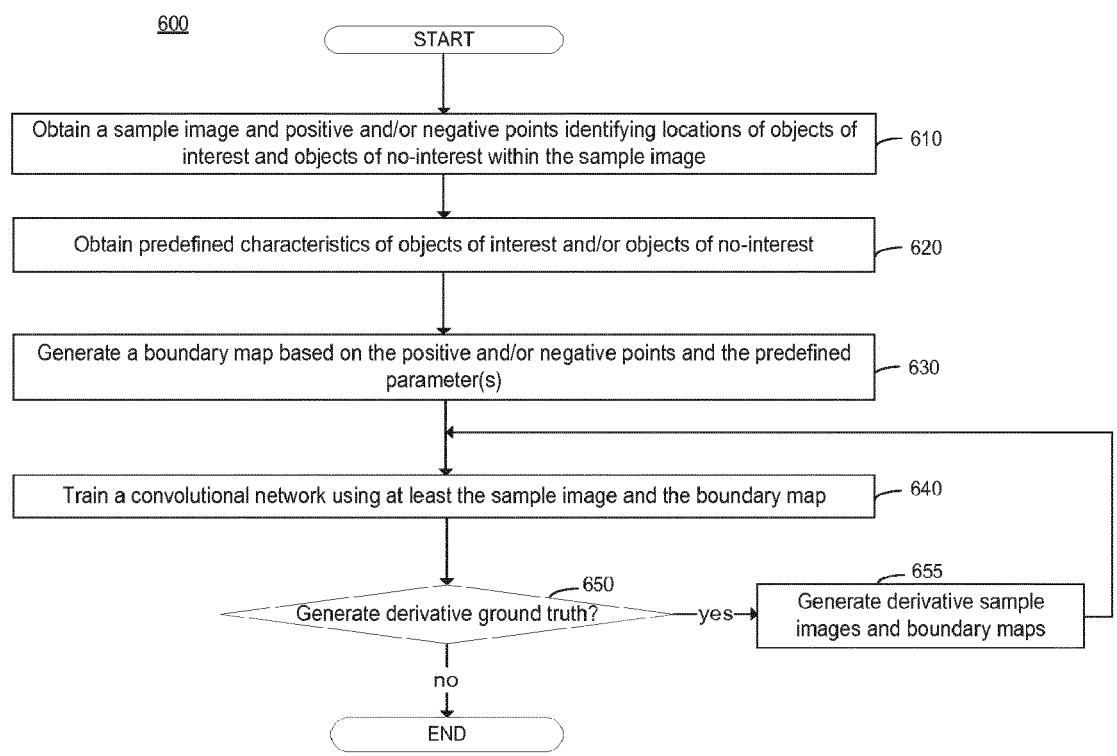
FIG. 6 illustrates a flowchart of an exemplary method for training a convolutional neural network, in accordance with some embodiments.

FIG. 6 illustrates a flowchart of an exemplary method 600 for training a convolutional network (e.g., network 113). Method 600 may be executed, for example, by network training engine 112 and/or by one or modules communicatively coupled to network training engine 112. Method 600 may be implemented, for example, in the form of executable instructions stored on at least one non-transitory machine-readable storage medium and executed by at least one processor or processor core. Method 600 may also be implemented in the form of electronic circuitry (e.g., hardware), or in the form of some combination of electronic circuitry and instructions executable by a processor. It will be appreciated by persons skilled in the art based on the following description of method 600 that some blocks of method 600 may be executed substantially concurrently or in a different order than shown in FIG. 6; that method 600 may include more or less blocks than are shown in FIG. 6;

and that some blocks of method 600 may, at certain times, be ongoing and/or may repeat.

Method 600 may begin at block 610 where the method may obtain (e.g., by engine 112) new ground truth data. As discussed above, the ground truth data may include a sample image and approximate location data associated with the sample image, where the approximate location data may include, among other things, point location data and scribble location data. Point location data may include a set of one or more positive points identifying locations of objects of interest, and/or a set of one or more negative points identifying locations of objects of no-interest within the sample image.

At block 620, the method may obtain (e.g., by engine 112) one or more predefined characteristics of objects of interest, objects of no-interest, or both. The predefined characteristics may describe or approximate the typical (average) object of interest and the typical object of no-interest by describing their shape, size, color, or any other common characteristics. Depending on the type of objects of interest and objects of no-interest for which a particular network 113 is trained, the two types of objects may have same, similar, or different characteristics. For example, in some embodiments, objects of interest may be approximated by a circle of a certain radius, and objects of no-interest may be approximated by a circle of a different radius. In these embodiments, the predefined characteristics of objects of interest may include a first predefined radius, and the predefined characteristics of objects of no-interest may include a second predefined radius that is different from the first predefined radius.

At block 630, the method may generate (e.g., using ground truth augmentation engine 412) a boundary map for the sample image based on the predefined characteristics and the available approximate location data, such as the set of one or more positive and/or the set of one or more negative points. For example, the generated boundary map may include, for each positive point, a positive area corresponding to the characteristics of objects of interest, and for each negative point, a negative area corresponding to the characteristics of objects of no-interest. For example, if the predefined characteristics include a first radius characterizing objects of interest and a second radius characterizing objects of no-interest, the generated boundary map may include a circle of the first radius around each positive point, and a circle of the second radius around each negative point. In some embodiments, the center of positive and negative area may correspond to the location of the respective positive and negative point. In other embodiments, the method may perform an image analysis of the image data around the positive and negative points to determine the approximate center of the respective object of interest or object of no-interest and to set that center as the center for the positive and negative area.

Figure 7:
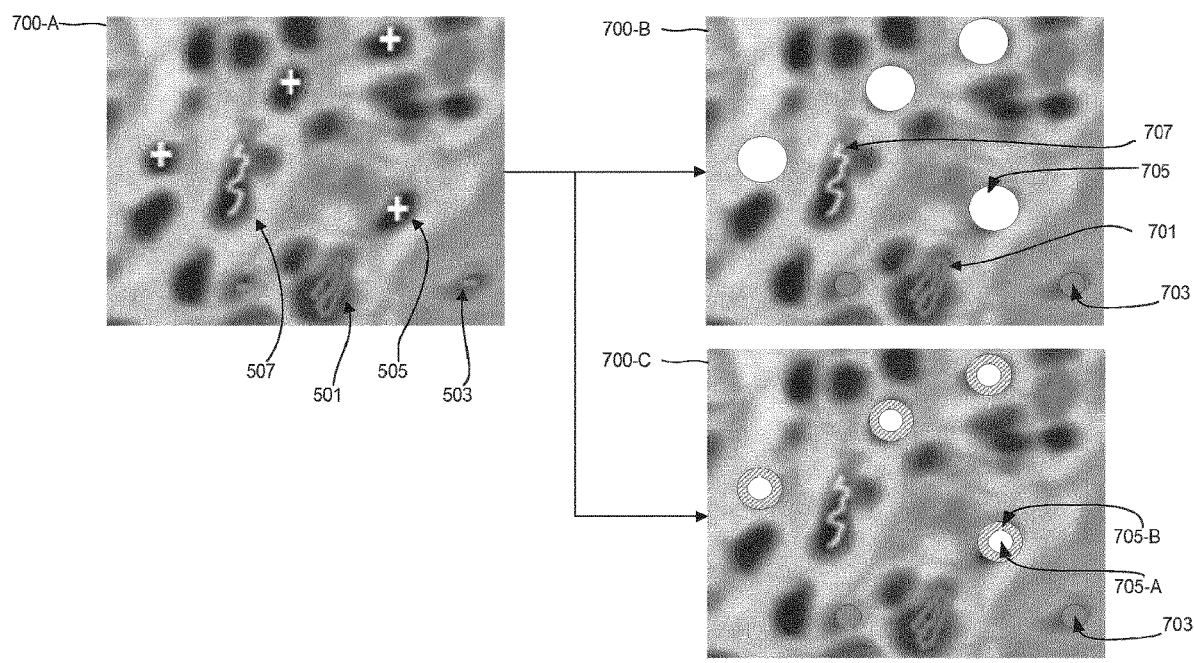
FIG. 7 illustrates a fragment of the exemplary sample image overlaid with approximate location data and exemplary boundary maps, in accordance with some embodiments.

The above example is further illustrated in FIG. 7. FIG. 7 shows an exemplary overlay 700-A of a fragment of sample image 500 with approximate location data (e.g., 501, 503, 505, 507), and an exemplary overlay 700-B of the same fragment with a boundary map generated based on the approximate location data. As shown in FIG. 7, for each positive point 505 and negative point 503, a corresponding positive area 705 and negative area 703 were generated, respectively. In this example, positive areas 705 have a first predefined radius, and negative areas 703 have a second predefined radius, in accordance with exemplary predefined characteristics discussed above.

In some embodiments, if approximate location data includes scribble data, the boundary map generated based on the approximate location data may include, for each positive and negative scribble, a corresponding positive and negative area. In some embodiments, the positive and negative areas in the boundary map may correspond exactly to (i.e., be copies of) the negative and positive scribbles. For example, in the example illustrated in FIG. 7, negative area 701 and positive area 707 in the boundary map correspond exactly of negative scribble 501 and positive scribble 507, respectively. In other embodiments, however, scribble data may be translated into the boundary map such that the resulting area in the boundary map is different from (e.g., larger than) the scribble data.

In some embodiments, the boundary map may associate each pixel with one of at least three values: positive (indicating that the pixel belongs to an object of interest), negative (indicating that the pixel belongs to an object of no-interest), and neutral (indicating that the pixels belongs to neither an object of interest nor an object of no-interest).

In some embodiments, in addition to generating the boundary map, method 600 may also generate (e.g., using ground truth augmentation engine 412) a weight map. The weight map may assign a weight for each pixel, or to at least all positive and negative pixels. The weight assigned to a pixel can represent a level of confidence that the pixel belongs to the right category indicated by the boundary map. In some embodiments discussed in more detail below, the weight map can be used together with the boundary map for training network 113. For example, if network 113 misclassifies a certain pixel (e.g., incorrectly identifies it as an object of interest), the amount of correction to network 113 will be greater if the pixel is assigned a higher weight (a higher confidence level) and lower if the pixel is assigned a lower weight. In some embodiments, the inner portions of the positive or the negative areas may be weighed higher than the outer portions, reflecting a higher confidence that the areas closer to the original positive and negative points correspond to objects of interest or objects of no-interest, respectively.

FIG. 7 illustrates an exemplary overlay 700-C of a fragment of sample image with an exemplary weight map. In this example, the entire negative area 703 has the same weight (e.g., 1), while positive areas 705 are divided into inner areas 705-A associated with higher weights (e.g., 1) and outer areas 705-B associated with lower weights (e.g., 0.5). It is appreciated that in other embodiments, the weights may be distributed in a continuous fashion, e.g., as a continuous inverse function of the distance from the respective positive point 505 or negative point 503.

Referring now back to FIG. 6, after generating the boundary map and (optionally) the weight map, method 600 may proceed to block 640, at which the method may train the convolutional network using the sample image, the boundary map, and optionally the weight map. In some embodiments, training the network may include feeding the sample image to the network, obtaining the resulting detection map 209, comparing detection map 209 with the boundary map, calculating errors (mismatches) between detection map 209 and the boundary map, and "back propagating" the errors through the network. As appreciated by a person skilled in the art, back propagation the errors will cause one or more of the network's trainable filters or other trainable parameters to be adjusted in a manner that would minimize the error and cause the network to produce more accurate results going forward. It will be appreciated that the term "training" as used herein refers to modifying one or more of the network's parameters, thereby improving the network's performance in terms of accurately detecting objects of interest. Thus, the network may be first trained by one image, then trained further by another sample image, and so forth, where each training step attempts to improve the network's performance.

In the embodiments in which a weight map has also been generated, the weights may be taken into account when calculating the errors between detection map 209 and the boundary map. For example, the error may be proportional or otherwise in a direct relationship to the weight.

In some embodiments, in order to further increase the utilization of the scarce ground truth data, method 600 may determine at block 650 that additional, "derivative" ground truth data can be generated based on the originally obtained ground truth data. In such cases, method 600 may proceed to block 655, where the method may generate (e.g., using ground truth augmentation engine 412) a derivative sample image, a corresponding derivative boundary map, and (optionally) a corresponding weight map. Derivative sample image and corresponding map(s) may be generated using any type of image manipulation or a combination of manipulations, such as flipping the sample image and the corresponding boundary and weight maps horizontally and/or vertically, rotating the sample image and the corresponding maps by a random angle, and the like. In some embodiments, each such manipulation may be performed with a random or pseudo-random probability.

After generating the derivative ground truth, the method may proceed back to block 640 where the network may be trained with the derivative ground truth following similar steps to those described above. It is appreciated that additional derivative ground truth can be generated in a similar manner, until the method determines at block 650 that no more derivative ground truth need to be generated (e.g., when a predetermined number of derivatives have been generated), after which the method may end.

After the training of network 113 has finished, object detection engine 114 may obtain and run through network 113 one or more new images of biological samples for which ground truth data is not available. As a result of running the each image through network 113, object detection engine 114 will obtain detection map 209. Use the information from detection map 209, object detection engine 114 may visualize or highlight objects of interest on the new image. For example, object detection engine 114 may provide the new image to display 118, and mark on the new image the locations of all objects of interest from detection map 209, or only objects of interest associated with probabilities higher than a threshold probability. In some embodiments, engine 114 may also indicate, for each marked object, the probability of that object being an object of interest, as discussed above and illustrated in FIG. 2B.

Fine-Tuning the Convolutional Neural Network

In some embodiments, after reviewing the results, the user may determine that some objects have been misclassified, i.e., incorrectly identified as objects of interest or incorrectly identified as objects of no-interest. The user may then manually select such misclassified objects and cause network training engine 112 to fine-tune network 113 in accordance with the selection. In other words, the user's selections may be treated as (or may be used to generate) new ground truth data that can be processed using the above-discussed methods to further train and improve the accuracy of network 113. For example, the new image may be provided to network training engine 112 as a sample image, and detection map 112 may be corrected based on the user input and then provided to network training engine 112 as the approximate location data (e.g., as a set of positive and negative points). In some embodiments, instead of providing to network training engine 112 the entire (corrected) detection map 112, only the points corrected by the user may be provided. Thus, in some embodiments, the user may only confirm the misclassification of some objects, while in other embodiments the user may also confirm that the rest of the objects have been properly classified. Both types of new information may sometimes be used by network training engine 112 to improve the performance of network 113. It is appreciated that the fine-tuning technique discussed above may be especially effective with and have greater impact on convolutional neural networks that have been trained with limited ground-truth data, such as network 113 described herein.

In the foregoing discussion, various devices, engines, units, or blocks (e.g., some or all blocks and sub-blocks of network 113 and engines 112 and 114) were described as being implementable using hardware, software, firmware, or any combination thereof. It must be appreciated by a person skilled in the art in view of the foregoing discussion that the hardware may include any type of analog and/or digital circuitry, such as integrated circuits (1C) (e.g., application-specific integrated circuits (ASICs) or field-programmable gate arrays (FPGAs)), or any other type of special- or general-purpose electronic circuitry. It must be further appreciated by a person skilled in the art that the software or firmware may include any type of processor executable instructions that can be stored on any type of tangible non-transitory computer-readable medium, where the instructions can be executed by a processing resource, causing the processing resource to implement the functionality of the respective component.

The executable instructions can be stored in memory 116, or in any other non-transitory computer-readable storage medium, which can be implemented as any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. The non-transitory computer-readable medium can be integrated in the same device as the processor resource or it may be separate but accessible to that device and the processor resource. In one example, the program instructions can be part of an installation package that when installed can be executed by the processor resource to implement the corresponding component. In this case, the computer-readable medium may be a portable medium such as a CD, DVD, or flash drive or a memory maintained by a server from which the installation package can be downloaded and installed. In another example, the program instructions may be part of an application or applications already installed, and the computer-readable medium may include integrated memory such as a hard drive, solid state drive, random access memory (RAM), read-only memory (ROM), and the like.

The processing resource for executing the instructions can be, for example, processor 117, or it can be any other processing resource, such as a CPU, a GPU, an FPGA, a TPU, another type of processor configured to retrieve and execute instructions, or a combination thereof. The processing resource can be integrated in a single device or distributed across devices, which may be integrated with image analysis system 100 or communicatively coupled to image analysis system 100.

Figure 8:
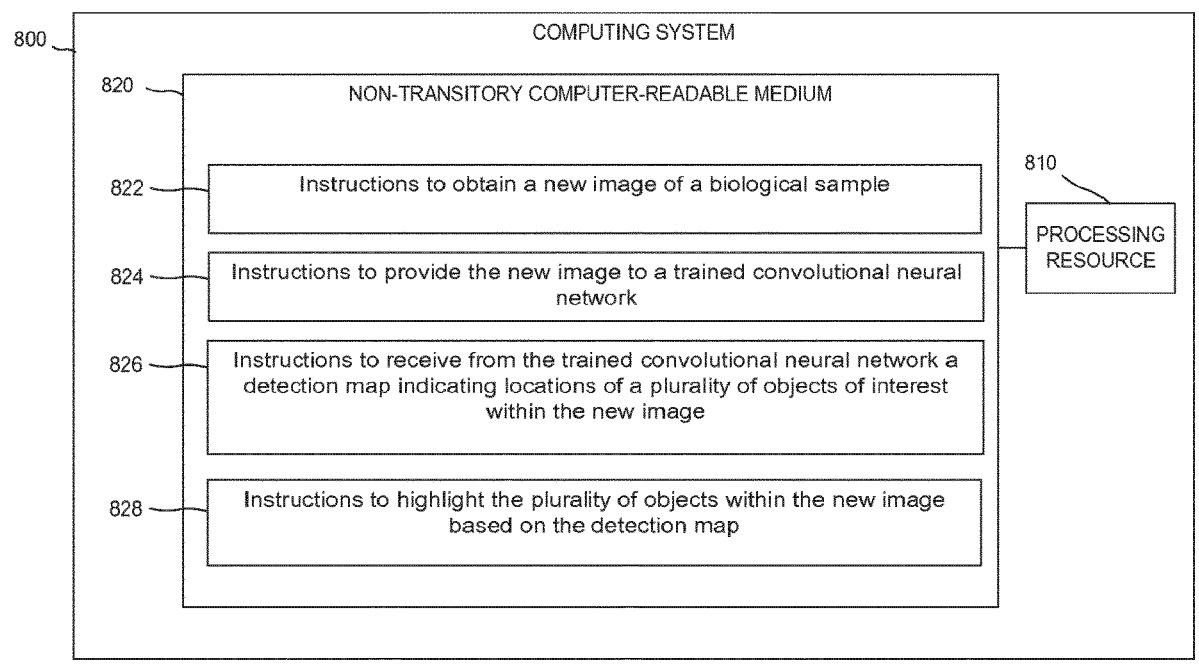
FIG. 8 illustrates an exemplary computing system comprising a processing resource and a non-transitory computer-readable medium storing exemplary instructions executable by the processing resource, in accordance with some embodiments.

FIG. 8 illustrates an example computing device 800, in according to some embodiments. Computing system 800 may correspond, for example, to system analysis 100, to a portion thereof, or to any other computing system suitable for performing the functionality described below. Computing system 800 may include a processing resource 810, which, as discussed above, may correspond to processor 117 or to any other processing resource suitable for performing the functionality described below. Computing system 800 may also include a non-transitory computer-readable storage medium 820, which, as discussed above, may correspond to memory 116 or to any other non-transitory computer-readable storage medium capable of storing instructions executable by processing resource 810.

In the particular example shown in FIG. 8, medium 820 may store instructions 822, 824, 826, 828, and any other instructions that can be fetched, decoded, and executed by processing resource 810. Instead of or in addition to retrieving, decoding, and executing instructions, processing resource 810 may include any number of electronic circuits comprising any number of electronic components for performing the functionality of any number of instructions in machine-readable storage medium 820. With respect to the executable instruction representations (e.g., boxes) described and shown herein, it should be understood that part or all of the executable instructions and/or electronic circuits included within one box may, in other examples, be included in a different box shown in the figures or in a different box not shown.

Instructions 822, when executed by a processor (e.g., 810), may cause a computing system (e.g., 800) to obtain a new image of a biological sample. Instructions 824, when executed by the processor, may cause the computing system to provide the new image to a trained convolutional neural network (e.g., 113). As discussed above, the trained convolutional neural network may include a plurality of encoders, where each encoder may include a first convolutional unit, a rectified linear unit, and a downsampling unit; and a plurality of decoders, where each decoder may include an upsampling unit and a second convolution unit, where each of the plurality of decoders is coupled to a corresponding encoder from the plurality of encoders. Instructions 826, when executed by the processor, may cause the computing system to receive from the trained convolutional neural network a detection map indicating locations of a plurality of objects of interest within the new image. Instructions 828, when executed by the processor, may cause the computing system to highlight the plurality of objects within the new image, based on the detection map.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A system configured to access and use a computer-implemented convolutional neural network to identify a plurality of objects of interest from an image depicting at least part of a biological sample, wherein the plurality of objects of interest correspond to a particular type of cell, and wherein the convolutional neural network comprises:
   a plurality of encoders comprising a first encoder that comprises a first convolutional unit, a rectified linear unit, and a downsampling unit, the first encoder being configured to:
      receive encoder input data that represents the image;
      process the encoder input data with at least the first convolutional unit and the rectified linear unit to produce processed data;
      downsample the processed data with the downsampling unit to produce downsampled processed data; and
      output the processed data and the downsampled processed data; and
   a plurality of decoders comprising a first decoder that comprises an upsampling unit and a second convolutional unit, the first decoder being configured to:
      receive decoder input data representing the image from a second decoder from the plurality of decoders or from a second encoder from the plurality of encoders;
      upsample the decoder input data to produce upsampled data;
      receive the processed data from the first encoder;
      combine the upsampled data with the processed data to produce combined upsampled data;
      process the combined upsampled data with at least the second convolutional unit to produce processed combined upsampled data; and
      output the processed combined upsampled data.

2. The system of claim 1, wherein the convolutional neural network further comprises a prediction unit configured to:
   access the processed combined upsampled data outputted by the first decoder; and
   transform the processed combined upsampled data to a detection map, wherein the detection map identifies a predicted location for each object of the plurality of objects of interest.

3. The system of claim 2, wherein the detection map further identifies a boundary for each object of the plurality of objects of interest.

4. The system of claim 2, wherein the detection map further identifies, for each pixel of the image, a probability of whether the pixel corresponds to an object of the plurality of objects of interest.

5. The system of claim 1, wherein the convolutional neural network further comprises a prediction unit configured to identify, based on the processed combined upsampled data, a quantity of the plurality of objects of interest.

6. The system of claim 1, wherein a quantity of the plurality of encoders is equal to a quantity of the plurality of decoders.

7. The system of claim 1, wherein a quantity of the plurality of encoders is different from a quantity of the plurality of decoders.

8. The system of claim 1, wherein the first decoder is further configured to combine the upsampled data with the processed data by appending a feature map of the upsampled data to another feature map of the processed data without modifying a pixel resolution of the upsampled data.

9. A method comprising:
accessing an image depicting at least part of a biological sample; and
applying a convolutional neural network to the image to generate an output identifying a plurality of objects of interest from the image, wherein the plurality of objects of interest correspond to a particular type of cell, and wherein applying the convolutional neural network includes:
receiving, by a first encoder of the convolutional neural network, encoder input data that represents the image, wherein the first encoder includes a first convolutional unit, a rectified linear unit, and a downsampling unit;
processing, by the first encoder, the encoder input data with at least a first convolutional unit and a rectified linear unit to produce processed data;
downsampling, by the first encoder, the processed data with a downsampling unit to produce downsampled processed data;
outputting, by the first encoder, the processed data and the downsampled processed data;
receiving, by a first decoder of the convolutional neural network, decoder input data representing the image from a second decoder from a plurality of decoders or from a second encoder from a plurality of encoders, wherein the first decoder includes an upsampling unit and a second convolutional unit;
upsampling, by the first decoder, the decoder input data to produce upsampled data;
receiving, by the first decoder, the processed data from the first encoder;
combining, by the first decoder, the upsampled data with the processed data to produce combined upsampled data;
processing, by the first decoder, the combined upsampled data with at least the second convolutional unit to produce processed combined upsampled data; and
outputting, by the first decoder, the processed combined upsampled data.

10. The method of claim 9, further comprising:
accessing, by a prediction unit of the convolutional neural network, the processed combined upsampled data outputted by the first decoder; and
transforming, by the prediction unit, the processed combined upsampled data to a detection map, wherein the detection map identifies a predicted location for each object of the plurality of objects of interest being depicted in the image.

11. The method of claim 10, wherein the detection map further identifies a boundary for each object of the plurality of objects of interest.

12. The method of claim 10, wherein the detection map further identifies, for each pixel of the image, a probability of whether the pixel corresponds to an object of the plurality of objects of interest.

13. The method of claim 9, further comprising identifying, based on the processed combined upsampled data, a quantity of the plurality of objects of interest.

14. The method of claim 9, wherein a quantity of the plurality of encoders is equal to a quantity of the plurality of decoders.

15. The method of claim 9, wherein a quantity of the plurality of encoders is different from a quantity of the plurality of decoders.

16. The method of claim 9, wherein combining the upsampled data with the processed data further includes appending, by the first decoder, a feature map of the upsampled data to another feature map of the processed data without modifying a pixel resolution of the upsampled data.

17. A non-transitory computer-readable medium comprising instructions which, when executed by one or more processors of a computing system, cause the computing system to perform one or more operations comprising:
accessing an image depicting at least part of a biological sample; and
applying a convolutional neural network to the image to generate an output identifying a plurality of objects of interest from the image, wherein the plurality of objects of interest correspond to a particular type of cell, and wherein applying the convolutional neural network includes:
receiving, by a first encoder of the convolutional neural network, encoder input data that represents the image, wherein the first encoder includes a first convolutional unit, a rectified linear unit, and a downsampling unit;
processing, by the first encoder, the encoder input data with at least a first convolutional unit and a rectified linear unit to produce processed data;
downsampling, by the first encoder, the processed data with a downsampling unit to produce downsampled processed data;
outputting, by the first encoder, the processed data and the downsampled processed data;
receiving, by a first decoder of the convolutional neural network, decoder input data representing the image from a second decoder from a plurality of decoders or from a second encoder from a plurality of encoders, wherein the first decoder includes an upsampling unit and a second convolutional unit;
upsampling, by the first decoder, the decoder input data to produce upsampled data;
receiving, by the first decoder, the processed data from the first encoder;
combining, by the first decoder, the upsampled data with the processed data to produce combined upsampled data;
processing, by the first decoder, the combined upsampled data with at least the second convolutional unit to produce processed combined upsampled data; and
outputting, by the first decoder, the processed combined upsampled data.

18. The computer-readable medium of claim 17, wherein the instructions further cause the computing system to perform one or more operations comprising:
accessing, by a prediction unit of the convolutional neural network, the processed combined upsampled data outputted by the first decoder; and
transforming, by the prediction unit, the processed combined upsampled data to a detection map, wherein the detection map identifies a predicted location for each object of the plurality of objects of interest being depicted in the image.

19. The computer-readable medium of claim 17, wherein a quantity of the plurality of encoders is different from a quantity of the plurality of decoders.

20. The computer-readable medium of claim 17, wherein combining the upsampled data with the processed data further includes appending, by the first decoder, appending a feature map of the upsampled data to another feature map of the processed data without modifying a pixel resolution of the upsampled data.

* * * * *